No. 781,677. PATENTED FEB. 7, 1905.
O. RICHARDS.
GEARING FOR AUTOMOBILES.
APPLICATION FILED OCT. 20, 1903.
2 SHEETS—SHEET 2.
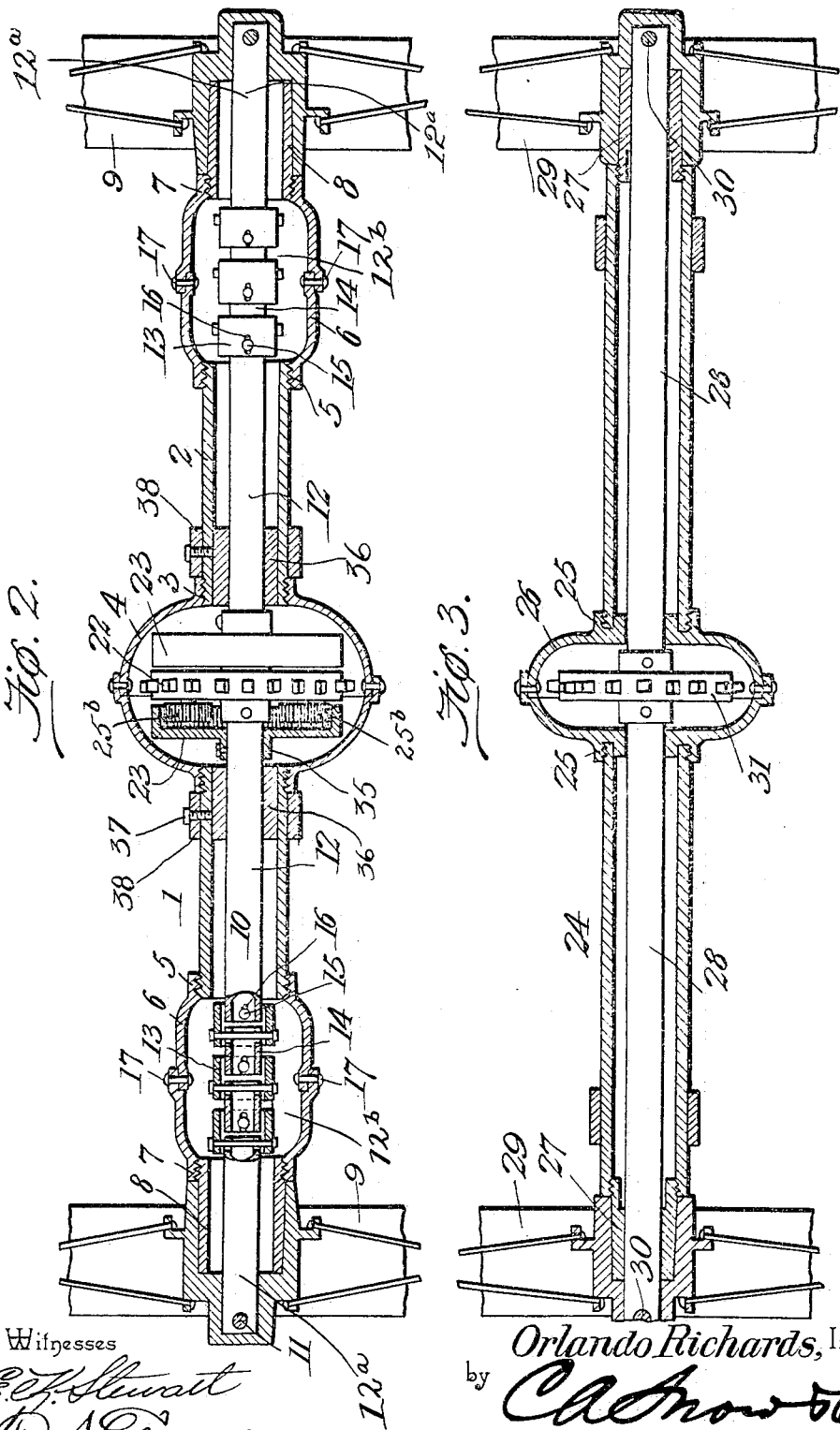
Witnesses
E. F. Stewart
F. S. Elmore
Orlando Richards, Inventor.
by C. A. Snow & Co.
Attorneys No. 781,677. Patented February 7, 1905.

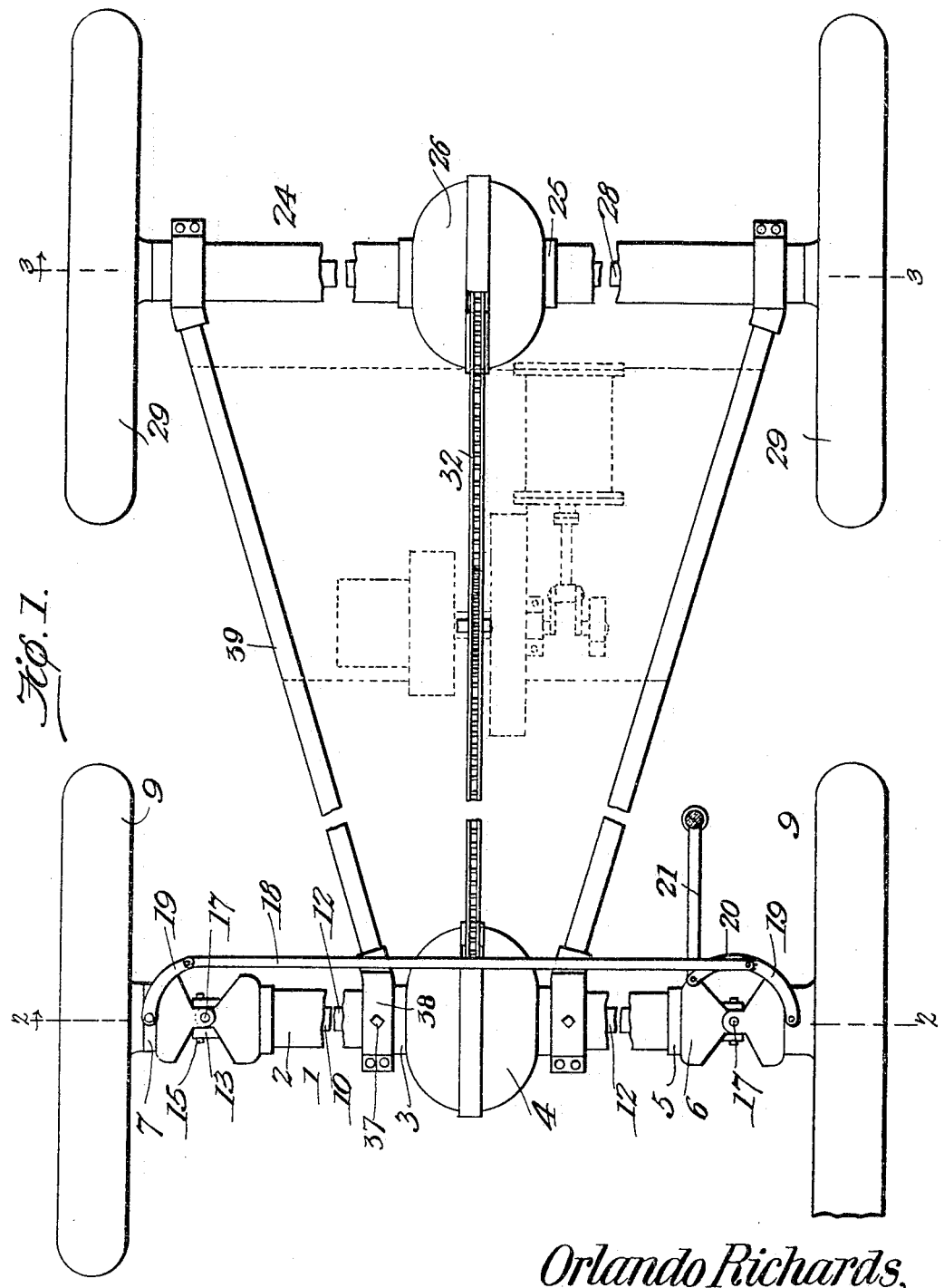

UNITED STATES PATENT OFFICE.

ORLANDO RICHARDS, OF BRISTOL, WISCONSIN.

GEARING FOR AUTOMOBILES.

SPECIFICATION forming part of Letters Patent No. 781,677, dated February 7, 1905.

Application filed October 20, 1903. Serial No. 177,785.

*To all whom it may concern:*

Be it known that I, ORLANDO RICHARDS, a citizen of the United States, residing at Bristol, in the county of Kenosha and State of Wisconsin, have invented a new and useful Gearing for Automobiles, of which the following is a specification.

My invention relates to gearing for automobiles and analogous vehicles in which the traction-wheels are positively driven by a power-operated shaft, and has for its objects to produce a device of this character of comparatively simple construction, in which the wheel-supporting axle and the drive-shaft are provided with coincident pivoted or flexible sections adjacent to their outer ends, whereby the wheels may be readily turned to facilitate guiding the machine in rounding abrupt or sharp curves.

With these and other objects in view the invention comprises the novel features of construction and combination of parts more fully hereinafter described.

In the accompanying drawings, Figure 1 is a plan view of a vehicle embodying my invention. Fig. 2 is a central longitudinal section of the front axle. Fig. 3 is a similar view of the rear axle.

Referring to the drawings, 1 indicates the front axle, composed, preferably, of a pair of tubular sections 2, disposed in parallel end-to-end relation and having their inner ends in threaded engagement with collars or flanges 3, provided upon a central hollow casing 4, and their outer ends in similar engagement with collars or flanges 5, provided upon end casings 6, having in turn upon the outer faces at points opposite to or in alinement with the flanges 5 similar flanges or collars 7, into which is screwed or otherwise secured the inner ends of tubular spindles 8, upon which the traction-wheels 9 are journaled for rotation, the outer ends of the collars 7 serving in this connection as bearing-shoulders for the inner ends of the wheel-hubs.

10 designates a drive-shaft extending centrally and longitudinally through the tubular axle 1 and having the wheels 9 fixed upon its outer ends by suitable keys 11, whereby the shaft serves in operation to positively drive the wheels. This shaft comprises a pair of preferably tubular sections 12, disposed end to end in parallel relation, with their inner adjacent ends projecting into the central casing 4 and each provided in turn with an end section 12ª, said end sections being connected, respectively, with the sections 12, each by a flexible portion 12ᵇ, housed within one of the end casings 6. The flexible portions 12ᵇ of the shaft each consists of a plurality of primary tubular members or sections 13 and a plurality of secondary sections 14, which are of considerably smaller diameter than the primary sections and are disposed centrally of, with their ends extending into the latter. The sections are connected or coupled by transverse pins or devices 15, extending through alined openings in the primary members and longitudinal slots 16 in the secondary sections, the pin connecting the ends of one pair of sections being disposed at right angles to that connecting the next pair, whereby a substantially universal motion or flexibility of the same as a whole is obtained.

Each of the end casings 6 is composed of a pair of sections having their meeting ends pivotally united by vertically-disposed pins or members 17, which permit the pivoting or turning of one section relative to the other in a horizontal plane, it being understood, of course, that in practice the outer section, carrying the spindle 8, is the one which will move. Thus each wheel may swing radially around the pins 17 as a center to facilitate guiding of the vehicle, and this swinging of the wheel will be permitted owing to the flexible portion of the drive-shaft being housed within the casing coincident with the pivotal point of the sections, while at the same time the shaft will during such turning of the wheels continue to positively drive the latter. The outer pivoted ends of the shaft are connected for uniform simultaneous movement by a rod or other connecting element 18, pivoted at its ends to crank-arms 19, in turn fixed at their inner ends to the upper faces of and projecting transversely outward from the collars 7 in a horizontal plane, one of said arms being connected by a link 20 with an operating-lever 21, which is manipulated as usual for steering the vehicle.

Housed within the casing 4 is the shaft-operating gearing consisting of a sprocket-wheel 22, loosely mounted upon the adjacent ends of the shaft-sections 12, and a pair of internally-toothed gear-casings 23, fixed one upon each of the shaft-sections and connected with the sprocket-wheel by means of pinions $25^b$, which coöperate with the gear-casings to constitute a differential gearing for driving the shaft-sections from the sprocket-wheel. The gear-casings 23 have collars 35, that abut upon sleeves 36, secured in the inner ends of the tubular shaft-sections 2 by means of set-screws 37, which also serve to secure in position upon the said tubular shaft-sections the collars 38 at the front ends of the reach-bars 39, which connect the front with the rear axle. In practice when the machine is traveling in a direct line the shaft-sections will operate at a uniform speed, but will when the machine is in the act of turning travel at a differential speed imparted through the gearing, as is customary in devices of this character.

24 designates the rear axle, consisting of a pair of tubular sections having their inner ends tapped into internally-threaded flanges 25, formed upon a central sectional casing 26, and their outer ends internally threaded to receive the inner ends of tubular spindles 27, upon which the traction-wheels are journaled. Extending centrally and longitudinally through the rear axle is a shaft 28, to the outer ends of which the wheels 29 are fixed by transverse pins or devices 30, while upon the center of the shaft, within the casing 26, there is fixed a sprocket-wheel 31, connected by a chain 32 with the wheel 22 on shaft 10, whereby in practice both shafts are positively driven for driving their respective wheels.

From the foregoing it will be seen that I produce a device of simple construction which is admirably adapted for the attainment of the ends in view; but it is to be understood that I do not limit myself to the precise details herein set forth, inasmuch as minor changes may be made therein without departing from the spirit or scope of the invention. For example, the shaft-sections 12 and 14 instead of being tubular, as herein shown, may be solid, and the shaft and its attendant parts may be employed for driving purposes in connection with various forms of machines and machinery other than that herein illustrated.

Having thus described my invention, what I claim is—

A tubular axle including a central hollow section having internally-threaded collars, tubular sections engaging said threaded collars, end casings, each consisting of a pair of pivotally-connected members, the inner members being provided with internally-threaded collars engaging the outer ends of the tubular sections, internally-threaded collars upon the outer ends of the outer members of the end sections, tubular spindles engaging said internally-threaded collars, and wheels journaled upon said spindles with the inner ends of their hubs contacting with the outer ends of the internally-threaded collars in which the tubular spindles are mounted; in combination with a drive-shaft disposed within the axle and having its extremities fixedly connected with the hubs of the wheels; said drive-shaft being composed of two inner and two outer members, the inner and the outer members being connected by universal joints disposed within the end casings of the tubular axle; internally-toothed gear-casings secured upon the inner shaft-sections near the inner, adjacent ends of the latter, a sprocket-wheel journaled loosely upon the adjacent ends of the inner shaft-sections which are thereby maintained in axial alinement, and gears disposed within and meshing with the internally-toothed gear-casings and connecting the latter with the sprocket-wheel.

In testimony that I claim the foregoing as my own I have hereto affixed my signature in the presence of two witnesses.

ORLANDO RICHARDS.

Witnesses:
 WM. C. CROSBY,
 W. H. HARRISON.